(12) United States Patent
Agranat (10) Patent No.: US 11,182,391 B1
(45) Date of Patent: Nov. 23, 2021

(54) HOST COMPUTING DEVICE MANAGEMENT

(71) Applicant: Amazon Technologies, Inc., Reno, NV (US)

(72) Inventor: Ronen Dov Agranat, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 14/307,392

(22) Filed: Jun. 17, 2014

(51) Int. Cl.
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC .. G06F 9/5055; G06F 9/45558; G06F 9/4856; G06F 16/24578
See application file for complete search history.

(56) References Cited

U.S. PATENT DOCUMENTS

| | | | | |
|---|---|---|---|---|
| 6,453,269 | B1* | 9/2002 | Quernemoen | G06F 11/3428 702/186 |
| 2005/0289071 | A1* | 12/2005 | Goin | G06F 11/008 705/56 |
| 2007/0250829 | A1* | 10/2007 | Hillier | H04L 41/0873 717/170 |
| 2008/0098309 | A1* | 4/2008 | Fries | G06F 9/451 715/734 |
| 2010/0333089 | A1* | 12/2010 | Talwar | G06F 9/45558 718/1 |
| 2011/0213911 | A1* | 9/2011 | Eidus | G06F 9/5033 711/6 |
| 2014/0040892 | A1* | 2/2014 | Baset | G06F 9/455 718/1 |

* cited by examiner

*Primary Examiner* — Apu M Mofiz
*Assistant Examiner* — Farhad Agharahimi
(74) *Attorney, Agent, or Firm* — Knobbe Martens Olson & Bear LLP (57) ABSTRACT

A host management service monitors status of host computing devices in a data center. Monitored status of the host computing devices can be stored and managed in a host information database. When an abnormal status of a host computing device is identified, the host management service can initiate a search event to find more host computing devices that might have a similar issue, for a preventive maintenance. The host management service can access data stored in the host information database and calculate an index representing similarity between host computing devices. The host management service can generate a list of host computing devices that are determined to be similar to a reference host computing device. The list of host computing devices can be sorted based on a similarity index and can be provided to an operator of the data center for efficient maintenance.

30 Claims, 7 Drawing Sheets

| HOST ID | ADDRESSING TYPE | OCCUPIED SLOTS | CPU UTILIZATION | ... | NETWORK BANDWIDTH |
|---|---|---|---|---|---|
| abc 123 | NAT | 4 | 98% | ... | 200 Mbps |
| def 456 | VPC | 8 | 72% | ... | 800 Mbps |
| ghi 789 | NAT/VPC | 6 | 95% | ... | 200 Mbps |
| ... | | | | | |
| xyz 887 | NAT/VPC | 12 | 64% | ... | 1,600 Mbps |

HOST COMPUTING DEVICE MANAGEMENT

BACKGROUND

Generally described, computing devices and communication networks can be utilized to exchange information. In a common application, a computing device can request content from another computing device via the communication network. In another common application, a computing device can request the execution of one or more software applications by another computing device via the communication network. Responsive to the requests from the requesting computing devices, the receiving computing devices can deliver requested content via the communication network or perform the requested action/execution.

Service providers can operate computer networks that interconnect a number of physical computing devices to support operations. The physical computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The physical computing systems can be generally referred to as host computing device. The data centers may be private data centers operated on behalf of an organization or public data centers operated on behalf, or for the benefit of, the general public.

In some instances, a data center service provider may allow a customer to request configuration or management of the host computing devices. For example, a data center service provider may provide one or more interfaces or data structures that allow for the management or configuration of host computing devices that have been associated with the particular customer. In some instances, however, particular interactions with the service provider might result in a configuration or management error. The source of the errors may be difficult to determine based on the specific interaction with the service provider. Additionally, in some embodiments, the configuration or management error may be applicable to additional host computing devices associated with the service provider.

BRIEF DESCRIPTION OF DRAWINGS

The foregoing aspects and many of the attendant advantages of this disclosure will become more readily appreciated as the same becomes better understood by reference to the following detailed description, when taken in conjunction with the accompanying drawings, wherein.

DETAILED DESCRIPTION

Generally described, aspects of the present disclosure relate to management of host computing devices. Specifically, systems and methods are disclosed which facilitate the management of host computing devices through utilization of a host management service. The host management service can provide a host computing device search component that facilitates the identification of one or more host computing devices associated with search criteria. In one aspect, a host management service obtains a search request including identification of a reference host computing device. Based on the identification of the reference host computing device, the host management service identifies other host computing devices that are determined to be similar to one or more aspects of the reference host computing device. In some embodiments, the host management service can sort the identified host computing device based on a determined degree of similarity between the reference host computing device and the identified host computing devices.

Figure 1:
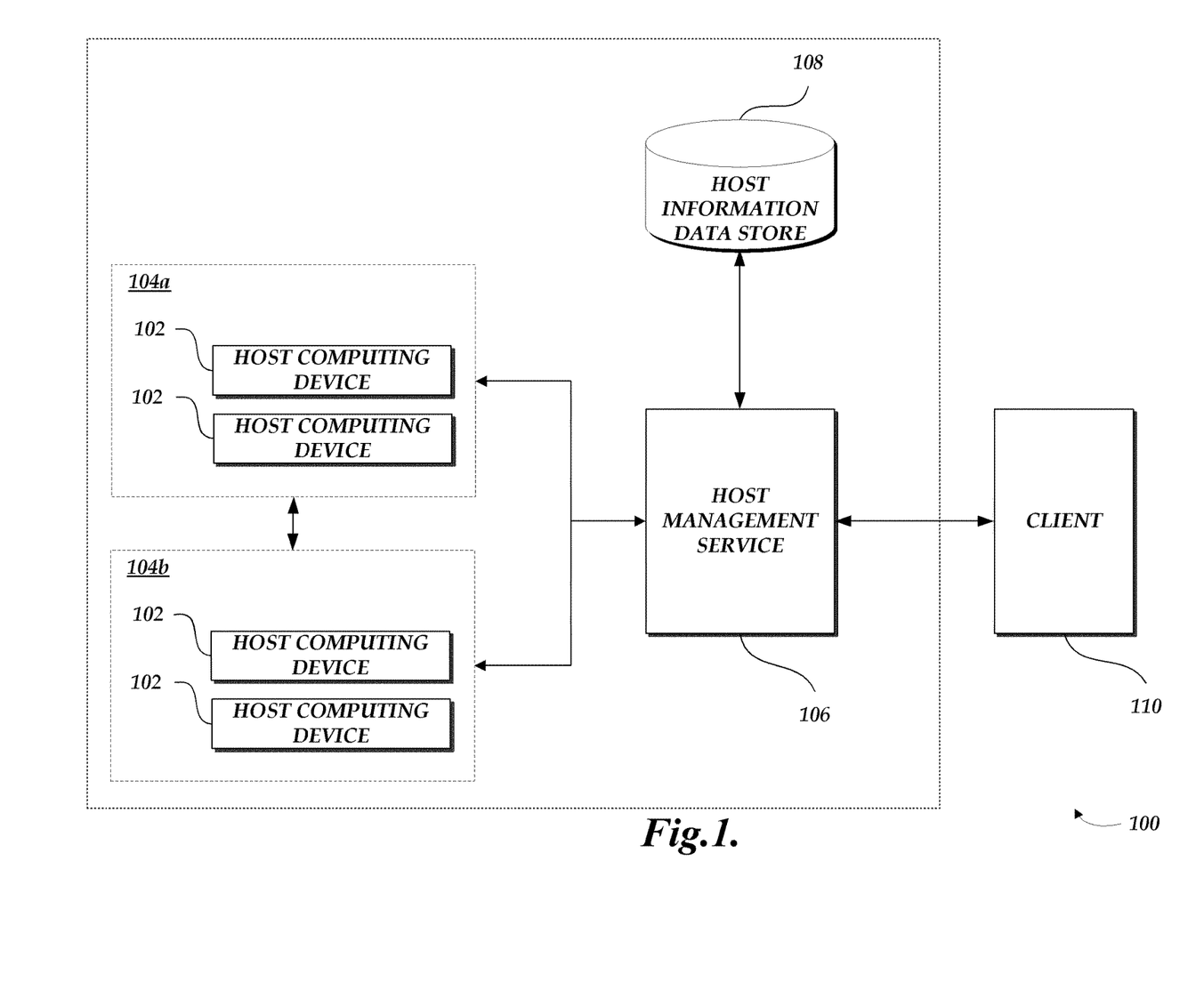
FIG. 1 is a block diagram depicting an illustrative operating environment of host computing device management.

With reference to FIG. 1, a block diagram depicting an illustrative operating environment 100 of host computing device management will be described. As illustrated in FIG. 1, the host management environment 100 can include a plurality of host computing devices 102. Illustratively, the host computing devices 102 may be physically located in one or more data centers or other facilities. One skilled in the relevant art will appreciate that the depiction of the host computing devices 102 is logical in nature and can be implemented by a single or multiple devices. Accordingly, groups of host computing devices 104a, 104b may correspond to subsets of host computing devices in one or more data centers.

The host management environment 100 can also include a host management service 106 that manages one or more aspects of the host computing devices 102. Illustratively, the host management service 106 can be utilized to provide the management of host computing devices 102, as will be described in greater detail below. However, it will be generally understood that additional configuration, management or other services associated with the instantiation of host computing devices 102 may be implemented by a service provider.

With continued reference to FIG. 1, the host management environment 100 can include a host information data store 108 for maintaining information related to the host computing devices 102. The host information data store 108 can store historical change of information and event log related to host computing devices. Although illustrated in FIG. 1 as a single data store, the host information data store 108 may be implemented as one or more data stores, which may also be implemented in a distributed manner.

As illustrated in FIG. 1, the host management environment 100 also includes a number of client computing devices 110 (generally referred to as clients) for communicating with the host management service 106 or host computing devices 102. In an illustrative embodiment, the client computing devices 110 can correspond to a wide variety of computing devices including personal computing devices, laptop computing devices, hand held computing devices, terminal computing devices, mobile devices (e.g., mobile phones, tablet computing devices, etc.), wireless devices, various electronic devices and appliances and the like. In an illustrative embodiment, the client computing devices 110 include necessary hardware and software components for establishing communications over a communication network, such as a wide area network or local area network. For example, the client computing devices 110 may be equipped with networking equipment and browser software applications that facilitate communications via the Internet or an intranet. The client computing devices 110 may have varied local computing resources such as central processing units and architectures, memory, mass storage, graphics processing units, communication network availability and bandwidth, etc. The client computing devices 110 can provide a user interface for managing the host computing devices 102. When a user of the client computing device 110 identifies an issue about a particular host computing device, the user can send a search request to find similar host computing devices that might have the same issue. The particular host computing devices can be a reference of the search request.

With respect to FIG. 2, one or more components of the host management service 106 of FIG. 1 will be described. Illustratively, the host management service 106 may be associated with computing resources such as central processing units and architectures, memory (e.g., RAM), mass storage or persistent memory, graphics processing units, communication network availability and bandwidth, etc. Generally, however, the host management service 106 may include one or more processing units, such as one or more CPUs. The host management service 106 may also include system memory, which may correspond to any combination of volatile and/or non-volatile storage mechanisms. The system memory may store information that provides an operating system component, various program modules, program data or other components. The host management service 106 performs functions by using the processing unit(s) to execute instructions provided by the system memory. The host management service 106 may also include one or more types of removable storage and one or more types of non-removable storage. Still further, the host management service 106 can include communication components for facilitating communication via wired and wireless communication networks.

Figure 2:
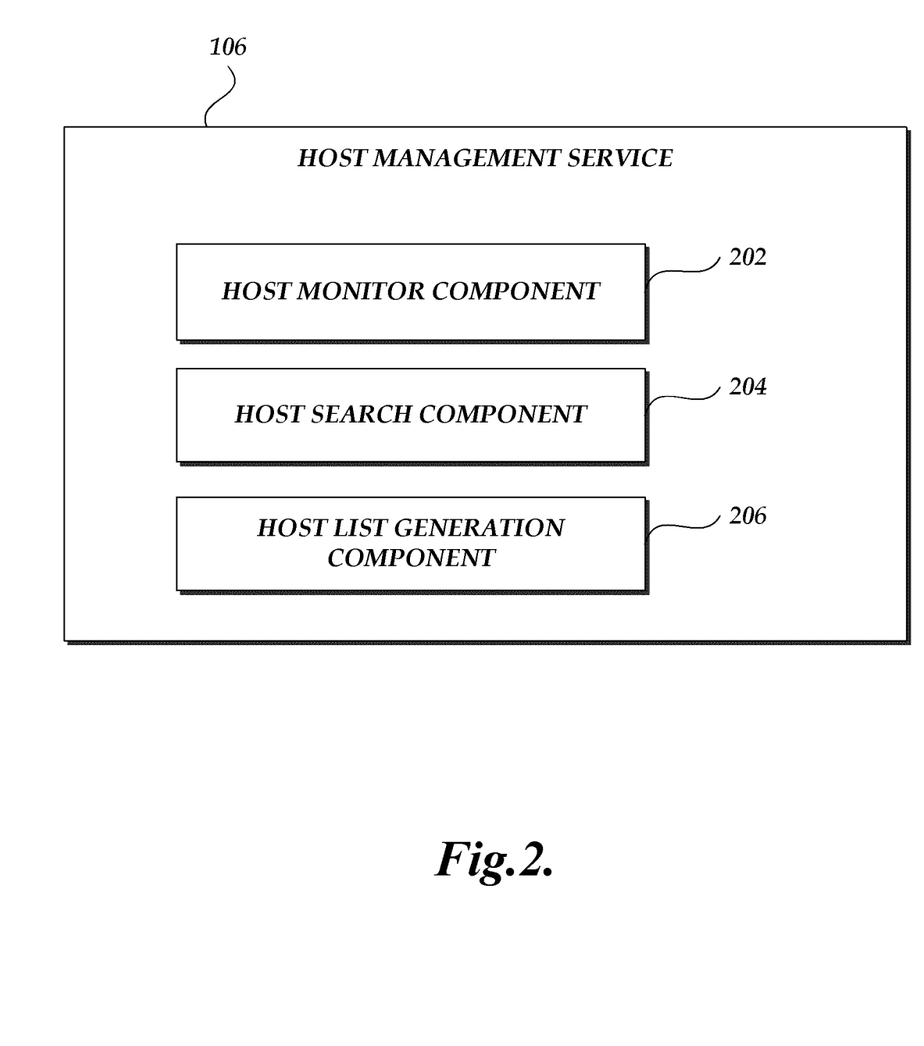
FIG. 2 is a block diagram illustrative of components of host management service having a host searching component.

As illustrated in FIG. 2, the host management service 106 can include, among other hardware or software components, a host monitor component 202, a host search component 204 and a host list generation component 206. Illustratively, the host monitor component 202 is operable to, at least in part, monitor status of the host computing device 102. The status of the host computing device 102 monitored by the host monitor component 202 can include hardware and software specification and operation status of the host monitor component 202. The host monitor component 202 can interact with the host computing device 102 and host information data store 108, via networks, to obtain and manage status of the host monitor component 202. The host monitor component 202 is also operable to identify an event related to the host computing device 102 based on the obtained status of the host computing device 102. For example, the host monitor component 202 can identify or characterize a status of a host computing device 102. In one embodiment, the host monitor component 202 can automatically initiate a search process to find other host computing devices similar to the computing device where the event occurred or for computing devices that have similar status to the host computing device based on a determination of particular status, such as an error status, failure status, or any other operation status that can distinguish the host computing device from other host computing devices.

The host search component 204 is operable to, at least in part, conduct a search for host computing devices 102. Illustratively, the host search component 204 can implement the search responsive to a search event requested from a client computing devices 110. In another embodiment, the host search component 204 can initiate search events based on a request from other components of the host management environment 100 without receipt of an expressed search request. The host search component 204 can further determine or derive search criteria from information associated with the search event or search request. For example, a search event may be associated with a reference host computing device in operation for hosting one or more instances of an application. When an event like an error status is detected at a reference host computing device, conditions or properties of the reference host computing device can be a search criterion to find another host computing device similar to the reference host computing device. In another example, a search criterion can be determined based on the information related to the reference host computing device specified in a search request from a client computing device 110. In another example, the host search component 204 also can identify a search criterion based on other elements related to previously conducted searches or preference of operator.

To conduct a search for host computing devices 102, the host search component 204 can calculate an index representing a determined similarity of a set of host computing devices to a search criterion based on information stored in the host information data store 108, which may be generally referred to as a similarity index. Illustratively, the information included in the similarity index can correspond to various forms of information indicating a comparison of a target host computing device to the reference host computing device including a percentage value, a numerical score, a category of similarity, and the like. Additionally, in some embodiments, the similarity index can include a vector that identifies a determined similarity of the target host computing device according to a set of criteria. One skilled in the relevant art will appreciate that various statistical or mathematical models can be utilized to calculate a similarity index or a similarity vector representing a degree of matching between a host computing device and one or more search criterion and may vary according to how the search criterion are specified or how various characteristics of the host computing devices are represented.

In some embodiments, the host search component 204 can calculate the entries in the similarity index based, at least in part, on past values associated with the host computing devices or a historical profile of status of a host computing device 102. For example, in one embodiment, the host search component 204 utilizes historical utilization of a host computing device as a search criterion in determining the similarity matrix. Accordingly, in this embodiment, that host search component 204 can compare one or more values associated with utilization of an identified resource (e.g., memory, CPU or network bandwidth) over time. The utilization of historical profiles allows the host search component 204 to not only identify similarity based on individual data, but to determine similarity over time based on common or similar patterns in history profiles of host computing devices. By way of example, assume a reference host computing device is reporting, or is otherwise associated with, a peak of processor utilization when executing commands. Accordingly, the host search component 204 can refer to utilization history profiles of other host computing devices to find a similar peak in determining whether similarities exist with the reference host computing device.

Illustratively, the host search component 204 can apply one or more thresholds of determined similarity index value in identifying whether a target host computing device is considered to be matching or whether a target host computing device should be identified in the similarity index, or how it should be identified in the similarity index. The thresholds applied by the host search component can be determined based on configuration information determined by a service provider/administrator, identified in the initial request, maintained in a user profile, or modified by feedback associated with a previous search.

With continued reference to FIG. 2, the host list generation component 206 is operable to provide a list of matching host computing device identified by the host search component 204. The host list generation component 206 can be configured to transmit, directly or indirectly, a completed list of identified host computing devices 102 to a client computing devices 110 or transmit a part of a search result which can be displayed as a list by the client computing devices 110. The host list generation component 206 can generate a series of data that corresponds to matching host computing devices identified by the host search component 204. The generated data can include identification, specification and the similarity index of a matching host computing device. The host list generation component 206 transmits the generated data to cause the client computing devices 110 to display a list of matching host computing devices. An example of user interface that can display a list of matching host computing devices will be described later referring to FIG. 6. The host list generation component 206 is also operable to provide information about factors that affect the similarity factor. For example, along with a similarity index, factors that contributed to the similarity index can be listed with representations of their contribution.

Figure 3A:
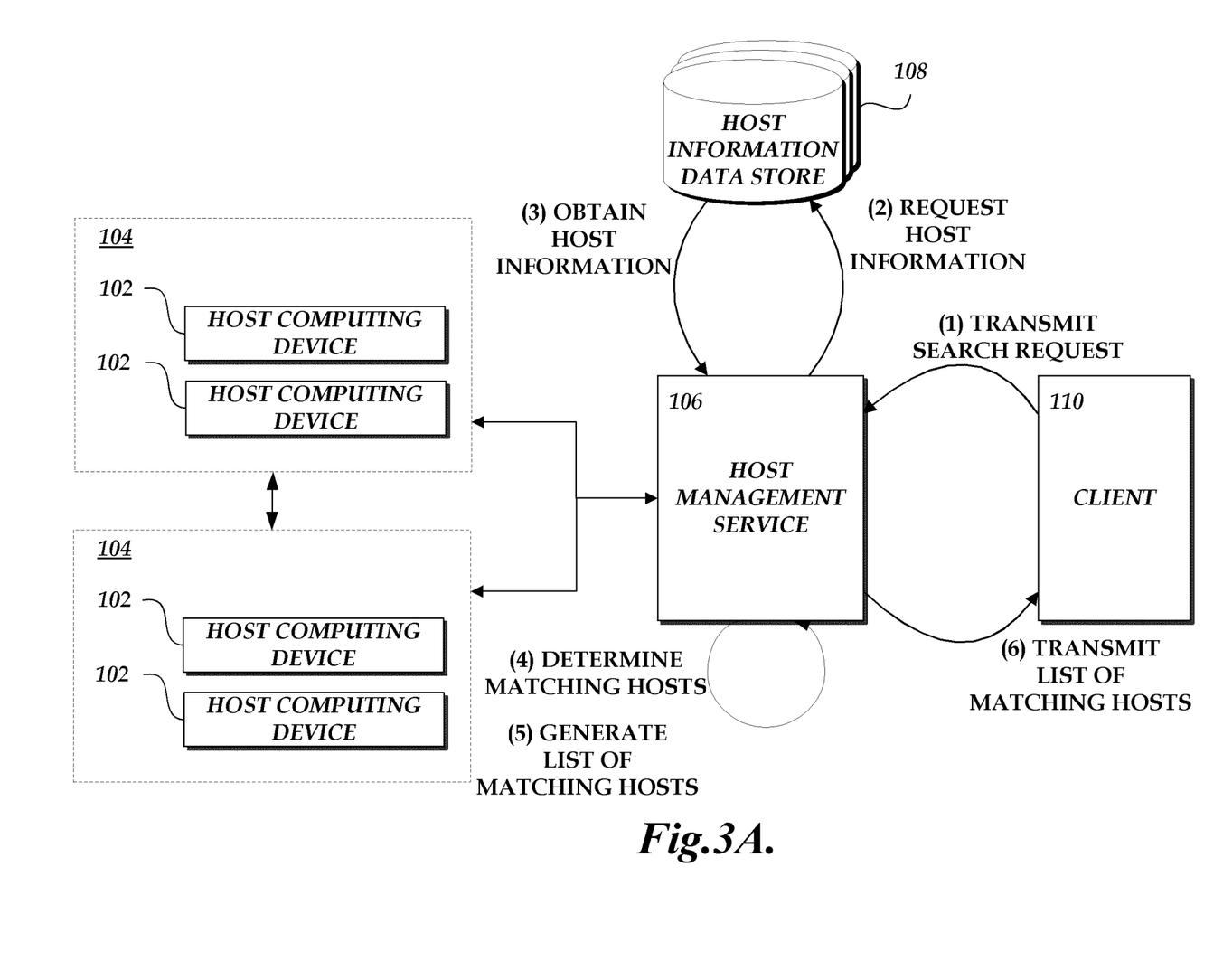
FIGS. 3A and 3B are block diagrams of the environment of FIG. 1 illustrating processes of host computing device management to handle a search request.
Figure 3B:
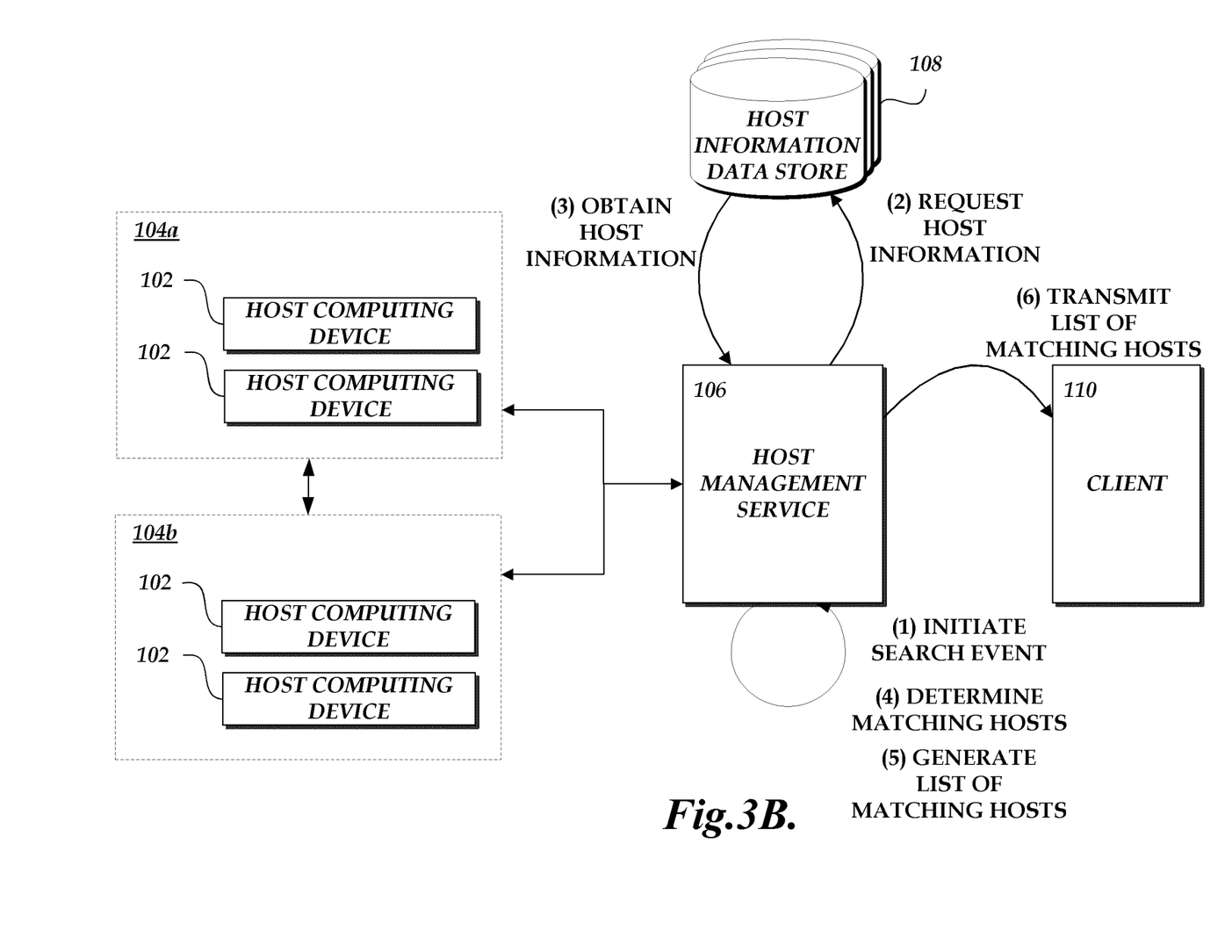

With reference to FIGS. 3A and 3B, a simplified diagram of the host management environment 100 of FIG. 1 illustrating processes of searching for host computing devices is depicted. As illustrated in FIG. 3A, at (1), the client computing device 110 transmits a request for host search. In one embodiment, an operator accesses a client computing device 110 configured to display information of the host computing devices 102 and to receive instructions to control or monitor one or more host computing devices 102. At some point, the operator identifies, or is notified of, an issue of a specific host computing device 102 or one or more software applications being executed by the host computing device 102. Accordingly, the operator may want to find other host computing devices 102 that may be similar to the reference host computing device experiencing the identified issue. By inputting one or various commands or controls via the client computing device 110, a search request can be sent to the host management service 106. For example, a search request can be initiated by a user interaction at a user interface provided for managing operation of a reference host computing device of which an issue is identified or notified. The search request can include identification, as a reference, of a specific host computing device 102 associated with the identified issue. The search request can include other information for host computing device search including identification of the operator, preference of the operator and search condition set by the operator. In some embodiments, the search request can be based on a user profile which includes preference and search conditions set by the operator.

With continued reference to FIG. 3A, at (2) the host management service 106 processes the received request and requests host information stored in the host information data store 108. In some embodiments, prior to requesting host information, the host management service 106 can determine scope or range of data to be requested or accessed by the host search component 204 of the host management service 106. In one aspect, search criterion can be determined based on the information obtained, or derived, from the search request received from the client computing device 110. In another aspect, search criterion can be determined among properties of a reference host computing device 102, the entity associated with the transmitted search (e.g., the operator) or other inputs. In some embodiments, a request for host information can be configured based on a user profile. The user profile can include information related to preferred search criteria of a user for searching a host computing device.

In response to the data request from the host management service 106, at (3), the host information data store 108 provides requested data to the host management service 106. Host information stored in the host information data store 108 can be provided to the host management service 106 synchronously to a search request or event. More specifically, the host information data store 108 may transmit a request for data collection to one or more host computing device 102, or group of host computing devices, responsive to the receipt of search request. In this embodiment, the request for data collection is configured, based on a search criterion identified from the search request, to request relevant host information. The collected information may correspond directly to the criteria used to determine a matching set of hosts. In other embodiments, host information stored in the host information data store 108 can be accessed by the host management service 106 asynchronously to a search request or event. More specifically, the host information data store 108 may acquire attribute information about one or more host computing devices 102, or groups of host computing devices, independent of any request for a search request. Host information obtained asynchronously to a search request or event can be cached in a separate storage in the host management service 106. The host information data can be modified and evaluated by the host management service 106 to find matching host computing devices based on a search criterion.

At (4), the host management service 106 can determine whether a host computing device matches to a search criterion or not. Illustratively, an index, vector or other representation of comparing a reference host computing device and search criteria can be calculated based on various mathematical models. For example, a calculated index can be compared to a threshold value to determine a matching host computing device 102. In another example, the host management service 106 can determine a predetermined number of host computing devices 102 as matching host computing devices. Once a host computing device is determined similar to another host computing device, the host management service 106 can store relation between the two devices in the host info data store 108 to keep it from repetitive calculations with the same host information.

After determining matching host computing devices, at (5), the host management service 106 generates a list of matching host devices. The host list generation component 206 can generate a series of data that corresponds to matching host computing devices identified by the host search component 204. The generated data can include identification, specification and a similarity index (e.g., the degree of matching) of a matching host computing device. In some embodiments, the generated data representing search result includes a comparison result between the reference host computing device and at least one matching host computing device. The host list generation component 206 transmits the generated data to cause the client computing device 110 displays a list of matching host computing devices.

At (6), the host management service 106 transmits the generated list to the client computing device 110. The client computing device 110 can display the list to help a user of the client computing device 110 find host computing devices which are similar to a reference host computing device defined in a search request. In some embodiments, the transmitted list can include a comparison result between the reference host computing device and at least one matching host computing device and the comparison may be displayed in a form of table. The client also provides a user interface to receive further instruction about matching host computing devices from a user of the client computing device 110.

In some embodiments, the host management service 106 also can provide a suggestion of additional actions for the listed host computing devices. For example, the host management service 106 can cause the client computing device 110 to display a suggested action that can be taken for a host computing device listed in a search result. When the client computing device 110 receives an approval for the suggested action from a user of the client computing device 110, the approval is transmitted to the host management service 106. In response to the approval, the host management service 106 can take the approved action or communicate with another system to implement the approved action.

With reference to FIG. 3B, an illustrative embodiment in which a search event request from a client computing device 110 is not required will be described. At (1), the host management service 106 can initiate a search event. In this embodiment, the host monitor component 202 of the host management service 106, or other component, can monitor the operation status of the host computing devices 102 or other information associated with the at least a subset of host computing devices 102. The host management service 106 can detect a circumstance which might need attention or reaction based on the monitored operation status of the host computing devices 102. For example, a determination that a host computing device 102 is no longer available or responsive, or a sudden change in performance characteristics of a host computing device could be identified, such a circumstance that requires more investigation. Once such a circumstance is identified, the host management service 106 can initiate a host search.

In another example, the host management service 106 can initiate a search event based on previous tasks done by an operator for managing the host computing devices. The client computing device 110 transmits information about the tasks conducted by an operator through the client computing device 110 to the host management service 106 rather than a direct search request. Then, based on the task information, the host management service can determine a search for host computing device that may be required. The host management service 106 can ask for approval from the operator who is using the client to conduct a host search.

After the search event is initiated by the host management service 106, similar processes as explained in connection with FIG. 3A can be executed to carry out the initiated search event. With continued reference to FIG. 3B, at (2) the host computing device 102 can request host information stored in the host information data store 108. The host management service 106 can determine data to be requested based on the search event initiated. In this embodiment, the host management service 106 can consider one or more factors that contributed to the determination to initiate the search event, or otherwise related to the search event, to determine a search criterion or data to be accessed to advance the search event. For example, if an abnormality regarding network traffic triggers a search event, the host management service 106 can include search criteria related to characteristics of network traffic or network capabilities/configuration as part of the submitted search criteria. In some embodiments, a request for host information can be configured based on a user profile. The user profile can include information related to preference of the user or conditions set by the user to conduct a search for a host computing device.

At (3), the host information data store 108 can provide requested data with the host management service 106 for host search. The requested data can be modified and evaluated to find matching host computing devices based on a search criterion. After having access to host information, the host management service 106, at (4), conducts determination of matching host computing devices. Once a set of host computing devices is determined to be in accordance with the search criterion, at (5), the host list generation component 206 can generate a sorted list of matching host computing devices based on similarity index. After a sorted search result is generated, at (6), the host management service 106 transmits the generated list to the client computing device 110.

Figure 4:
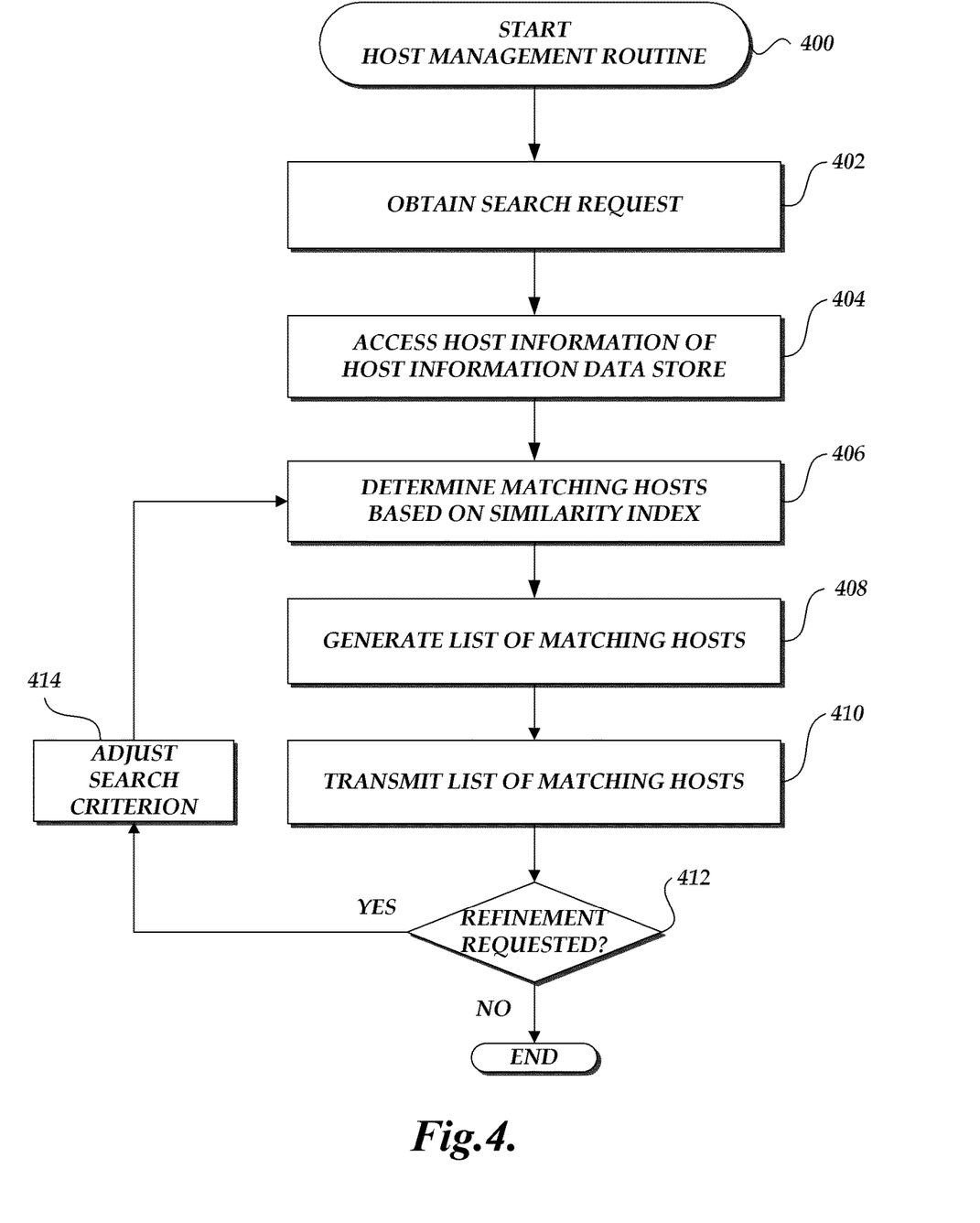
FIG. 4 is a flow diagram illustrative of a host computing device managing routine implemented by a host management service.

Turning now to a flow chart of FIG. 4, a routine 400 for host computing device management will be described. This routine can be carried out by, for example, a host management service 106 (FIG. 1). At block 402, the host management service 106 can obtain a search request from the client computing device 110. As previously described, the search request can be transmitted from the client computing device 110 via interaction with an interface, such as a graphical user interface or other interface. Responsive to the received search request, the host search component 204 of the host management service 106 can derive search criteria from information associated with the search request. For example, a search event may be associated with a reference host computing device and a search criterion can be determined based on the information related to the reference host computing device. Conditions related to previous searches can be considered for determining a search criterion from a search request. In some embodiments, a search request for host information can be configured based on a user profile. The user profile can include information like identification of a user, preference of the user or conditions set by the user to conduct a search for a host computing device.

At block 404, the host management service 106 can access host information in preparation of a host computing device search. The host management service 106 communicates with the host information data store 108 to access host information stored in the host information data store 108. As previously described, the host information stored in the host information data store 108 can be provided to the host management service 106 synchronously to a search request or event. More specifically, the host information data store 108 may transmit a request to one or more host computing device 102, or group of host computing devices, responsive to the receipt of search request. In this embodiment, the collection of the information may correspond directly to the criteria used to determine a matching set of hosts. In other embodiments, host information stored in the host information data store 108 can be accessed by the host management service 106 asynchronously to a search request or event. More specifically, the host information data store 108 may acquire attribute information about one or more host computing devices 102, or groups of hosts, independent of any request for a search request. Host information obtained asynchronously to a search request or event can be cached in a separate storage in the host management service 106. The host information data can be modified and evaluated by the host management service 106 to find matching host computing devices based on a search criterion.

The host information can be combined with a search criterion obtained from a search request to yield an index for determining relation between a host computing device and the reference host computing device identified in a search request. Host information can be obtained from the host information data store 108 in a synchronous or synchronous way to a search request from the client computing device 110.

At block 406, the host management service 106 can identify one or more host computing devices 102 that match to a search criterion based on similarity index. The host management service 106 can determine whether the host computing device matches the search criteria. Additionally, the host management service 106 can determine or calculate a degree of matching to a search criterion. For example, the host management service 106 can calculate a similarity index or a similarity vector. Additionally, in some embodiments, the host management service 106 can apply one or more threshold values of similarity index or apply a threshold number of similar hosting device to determine sets of matching host computing device. These thresholds can be adjusted based on previous searches and feedback on the previous searches. Additionally, the host management service 106 can also apply weighting factors to emphasize or de-emphasize one or more factors for purposes of matching.

At block 408, the host management service 106 can generate a search result. In this embodiment, the search result is generated as a list of matching host computing devices. The host list generation component 206 can generate a series of data that corresponds to the matching host computing devices identified by the host search component 204. The generated data can include identification, specification and a similarity index of a matching host computing device. After a search result is generated, at block 410, the host management service 106 can transmit the search result to the client computing device 110. In addition, a search result generated by host list generation component 206 can include a comparison result between a reference host computing device and a matching host computing device. For example, common features or different features between a reference host computing device and a matching host computing device can be included in the comparison result.

At block 412, a refinement request is sent back to the host management service 106 in response to a search result received. If there are too many matching host computing devices, applying additional search criteria can be helpful to limit the numbers of host computing devices in a search result. In another embodiment, weights applied for multiple search criteria to calculate a similarity index can be adjusted to enhance search result. Prioritization for multiple search criteria can also be adjusted based on the refinement request from the client computing device 110.

At block 414, the host management service 106 can change a search criterion based on a request to refine the search result. Host search component 204 of the host management service 106 can conduct a new search based on the updated search criterion. Then, processes in reference to blocks 406, 408 and 410 can be executed by the host management service 106 again before prompting a user of the client computing device 110.

Figure 5:
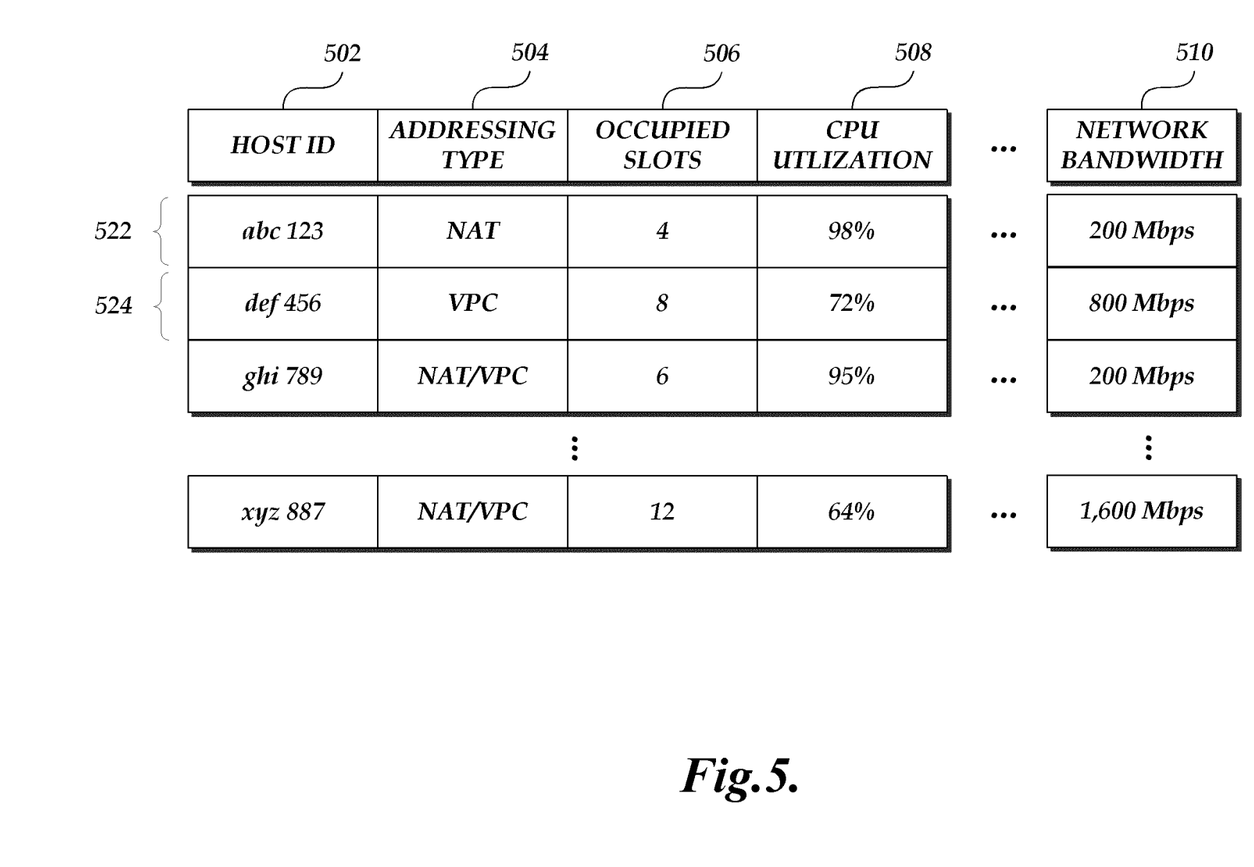
FIG. 5 is a table illustrative of host computing device information stored in a host information database of FIG. 1.

With respect to FIG. 5, data stored in the host information data store 108 of FIG. 1 is illustrated. The host information data store 108 can store information observed by the host monitor component 202 of the host management service 106. The host information data store 108 also can rely on another database or other monitoring system which can provide information on the host computing devices 102 in operation for hosting one or more application instances. Data associated with a host computing device can include Host ID 502, addressing type 504, number of occupied slots 506 (number of available resources for hosting instances), CPU utilization 508, network bandwidth 510 and so forth. Though not shown in FIG. 5, the host information data store also can store and maintain various properties of a host computing device including number of instances that can be hosted, number of active instances, usage classes like testing, production and spare, specification of computing unit, versions of software and utilization of a host in various aspects (overall capacity, memory, bandwidth and so forth.) In addition, the host information data store 108 can store not only present properties of a host computing device but also historical changes of the properties. The first host computing device 522 has identification of "abc 123" and has 5 occupied slots. The second host computing device 524 shows 72 percent of utilization and 800 Mbps of network bandwidth. A data entry associated with a host computing device can also include secondary information derived from other information stored in the host information data store 108.

Figure 6:
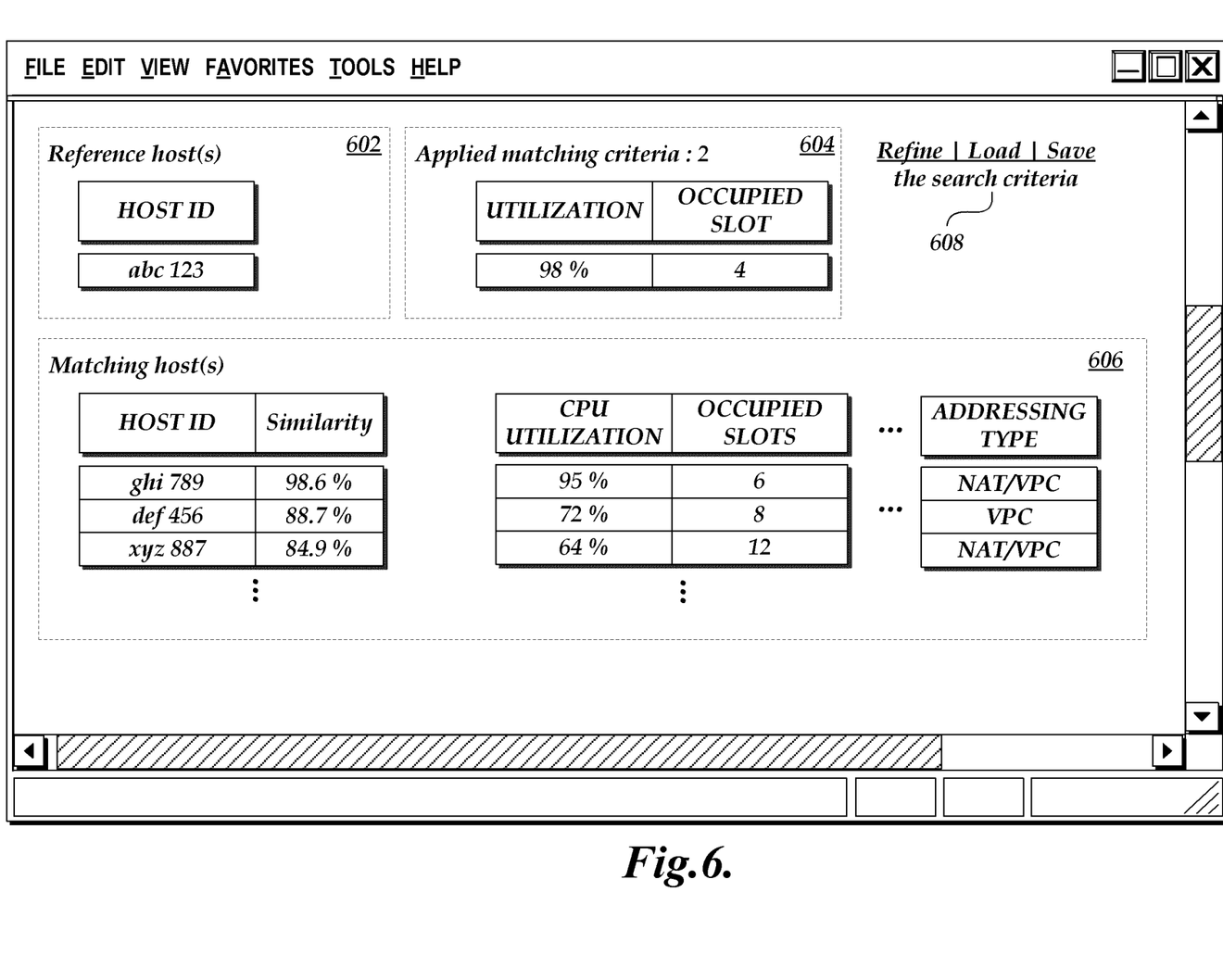
FIG. 6 is a user interface illustrative of a sorted list of host computing devices in response to a search request.

With respect to FIG. 6, a search result on the client computing device 110 of FIG. 1 is illustrated. Information of a reference host computing device 102 is displayed at the top left corner. In this embodiment, an operator in a data center worked on a server "abc 123" to fix an issue related to utilization and occupied slot. The operator initiated host searching processes to check that other servers with similar conditions also have the same issue he fixed. To find the other similar servers, he pointed the server "abc 123" as a reference for a search and specified that utilization and occupied slot as matching criteria. The applied matching criteria 604 are shown next to the reference host ID 602. After conducting search processes based on the reference host ID 602 and the matching criteria 604, a list of matching servers 606 is returned. Various information including utilization and occupied slot is provided in a form of list. Entries in the list are sorted by a calculated similarity. As shown in FIG. 6, a server (host computing device) with host ID "ghi 789" has the highest value of similarity of 98.6% as it had the closest values of utilization and occupied slot with the reference server "abc 123." Further, the operator can refine the search result by selecting links 608 to refine the matching criteria. Links 608 allow a user to refine search criteria, to load previously searched criteria and to save current search criteria to a user profile managed by the host management service 106. The user profile can store additional preference of a user regarding generation and display of a search result.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored in a computer-readable medium and loaded into memory of the computing device using a drive mechanism associated with a computer readable storage medium storing the computer executable components such as a CD ROM, DVD ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing host computing devices, the method comprising:
    as implemented by one or more computing devices configured with specific computer-executable instructions,
    obtaining a search request from a client, wherein the search request includes identification of a reference host computing device operated by a service provider for hosting one or more virtual machine instances on behalf of the client;
    identifying at least one search criterion associated with the request, wherein the at least one search criterion corresponds to a property of the reference host computing device;
    accessing host information stored in a host information database, wherein the host information includes information regarding a corresponding property of individual host computing devices of one or more host computing devices operated by the service provider for hosting a virtual machine instance;
    calculating a similarity index for the individual host computing devices of the one or more additional host computing devices operated by the service provider, wherein a similarity index is calculated based at least in part on comparing the property of the reference host computing device with the corresponding property of the individual host computing device, and wherein the similarity index represents a determined similarity between performance of the one or more virtual machine instances when hosted on the individual host computing device and performance of the one or more virtual machine instances when hosted on the reference host computing device;
    determining one or more matching host computing devices based at least in part on the similarity indices; and
    generating, in response to the search request, a search result, wherein the search result includes information regarding the one or more matching host computing devices along with at least a portion of information included in the similarity index for the one or more matching host computing devices.

2. The computer-implemented method as recited in claim 1, wherein the search request is initiated by a user interaction at a user interface provided for managing operation of the reference host computing device.

3. The computer-implemented method as recited in claim 1, wherein identifying at least one search criterion associated with the request includes obtaining a user profile to identify the at least one search criterion.

4. The computer-implemented method as recited in claim 1, wherein identifying at least one search criterion associated with the request includes identifying at least one search criterion that corresponds to at least one of: a number of available resources for hosting one or more instances, an addressing type, utilization, or network bandwidth of the reference host computing device.

5. The computer-implemented method as recited in claim 1, wherein the search result is sorted based at least in part on the similarity indices.

6. The computer-implemented method as recited in claim 1 further comprising:
    obtaining an update request to modify at least one search criterion from the client computing device;
    in response to the update request, calculating an updated similarity index for the individual one or more additional host computing devices;
    determining at least one matching host computing device based at least in part on the updated similarity index for the individual one or more additional host computing devices; and
    transmitting an updated search result to the client computing device, wherein the updated search result includes one or more of the updated similarity indices.

7. A system comprising:
    a computing device comprising a processor coupled to a memory, the memory including instructions that upon execution configure the system to at least:
    obtain a search request, wherein the search request includes identification of a reference host computing device operated by a service provider for hosting one or more virtual machine instances;
    identify at least one search criterion associated with the request, wherein the at least one search criterion corresponds to a property of the reference host computing device;
    access host information stored in a host information database, wherein the host information includes information regarding a corresponding property of individual host computing devices of one or more host computing devices for hosting a virtual machine instance;
    determine at least one matching host computing device based at least in part on a determined similarity between performance of the one or more virtual machine instances when hosted on the reference host computing device and performance of the one or more virtual machine instances when hosted on an individual host computing device of the one or more host computing devices, wherein the determined similarity compares the property of the reference host computing device to the corresponding property of the individual host computing device; and generate a search result in response to the search request, wherein the search result includes information regarding the at least one matching host computing device.

8. The system as recited in claim 7, wherein the search request is initiated by a user interaction at a user interface provided for managing operation of the reference host computing device.

9. The system as recited in claim 7, wherein the search request is initiated in response to an event detected at the reference host computing device.

10. The system as recited in claim 9, wherein the event detected at the reference host computing device corresponds to an error.

11. The system as recited in claim 7, wherein the search result includes a comparison result between the reference host computing device and the least one matching host computing device.

12. The system as recited in claim 9, wherein the at least one search criterion is associated with the detected event.

13. The system as recited in claim 7, wherein the at least one search criterion associated with the request is identified by obtaining a user profile to identify the at least one search criterion.

14. The system as recited in claim 7, wherein the at least one search criterion corresponds to at least one of: a number of available resources for hosting one or more instances, an addressing type, utilization, or network bandwidth of the reference host computing device.

15. The system as recited in claim 7, wherein the at least one matching host computing device is determined based at least in part on host information obtained from a host information database synchronously to the search request.

16. The system as recited in claim 7, wherein the at least one matching host computing device is determined based at least in part on host information obtained from a host information database asynchronously to the search request.

17. The system as recited in claim 7, wherein the memory includes further instructions that upon execution further configure the system to at least calculate a similarity index between performance of the one or more virtual machine instances when hosted on individual host computing devices of the one or more host computing devices and performance of the one or more virtual machine instances when hosted on the reference host computing device, and wherein the search result includes the similarity index of the at least one matching host computing device.

18. The system as recited in claim 17, wherein the search result is sorted on the similarity indices.

19. The system as recited in claim 7, wherein the memory includes further instructions that upon execution configure the system to at least transmit the generated search result, in response to the search request, to a client computing device.

20. A non-transitory, computer-readable storage medium storing computer-executable instructions that, when executed by a computer system, configure the computer system to perform operations comprising:

obtaining a search request, wherein the search request includes identification of a reference host computing device operated by a service provider for hosting one or more virtual machine instances;

identifying at least one search criterion associated with the search request, wherein the at least one search criterion corresponds to a property of the reference host computing device;

accessing host information stored in a host information database, wherein the host information includes information regarding at least one corresponding property of one or more host computing devices for hosting a virtual machine instance;

determining one or more matching host computing devices based at least in part on comparisons between the identified at least one search criterion and the at least one corresponding property of individual one or more host computing devices;

calculating a similarity index for individual host computing devices of the one or more matching host computing devices based at least in part on the comparisons, wherein the similarity index relates performance of the one or more virtual machine instances when hosted on the individual host computing device and performance of the one or more virtual machine instances when hosted on the reference host computing device; and transmitting, in response to the search request, a search result which lists the one or more matching host computing devices along with the similarity index for the one or more matching host computing devices.

21. The non-transitory, computer-readable storage medium as recited in claim 20, wherein the search request is initiated by a user interaction at a user interface provided for managing operation of the reference host computing device.

22. The non-transitory, computer-readable storage medium as recited in claim 20, wherein the search request is initiated in response to an event detected at the reference host computing device.

23. The non-transitory, computer-readable storage medium as recited in claim 22, wherein the event detected at the reference host computing device corresponds to an error.

24. The non-transitory, computer-readable storage medium as recited in claim 22, wherein identifying the at least one search criterion associated with the request includes identifying a property of the reference host computing device associated with the detected event as the at least one search criterion.

25. The non-transitory, computer-readable storage medium as recited in claim 20, wherein identifying the at least one search criterion includes obtaining a user profile to identify the at least one search criterion.

26. The non-transitory, computer-readable storage medium as recited in claim 20, wherein the at least one search criterion corresponds to at least one of: a number of available resources for hosting one or more instances, an addressing type, utilization, or network bandwidth.

27. The computer-implemented method as recited in claim 1, wherein the similarity index for an additional host computing device is calculated, at least in part, by comparing utilization of an identified resource of the additional host computing device to utilization of a corresponding resource of the reference host computing device.

28. The computer-implemented method as recited in claim 27, wherein the identified resource of the additional host computing device comprises one or more of a memory, processor, network bandwidth, or data store.

29. The system as recited in claim 7, wherein the at least one property of the reference host computing device comprises at least one of a memory utilization, processor utilization, network bandwidth utilization, data store utilization, memory capacity, number of available processors, processor speed, available network bandwidth, maximum network bandwidth, or data store capacity.

30. The non-transitory, computer-readable storage medium as recited in claim 20, wherein the similarity index between an individual matching host computing device and the reference host computing device is calculated based at least in part on a weighting factor for the comparison between the identified at least one search criterion and the at least one property of the individual matching host computing device.

* * * * *